US005585035A

United States Patent [19]

Nerad et al.

[11] Patent Number: 5,585,035
[45] Date of Patent: Dec. 17, 1996

[54] LIGHT MODULATING DEVICE HAVING A SILICON-CONTAINING MATRIX

[75] Inventors: Bruce A. Nerad, Oakdale, Minn.; George F. Vesley, Hudson, Wis.

[73] Assignee: Minnesota Mining and Manufacturing Company, St. Paul, Minn.

[21] Appl. No.: 103,271

[22] Filed: Aug. 6, 1993

[51] Int. Cl.⁶ .............................. C09K 17/52; G02F 1/13
[52] U.S. Cl. .................. 252/269.01; 428/1; 252/299.5; 349/89
[58] Field of Search .................... 252/299.01, 299.5; 428/1; 359/52

[56] References Cited

U.S. PATENT DOCUMENTS

| | | | |
|---|---|---|---|
| 4,101,207 | 7/1978 | Taylor | 252/299.1 |
| 4,435,047 | 3/1984 | Fergason | 350/334 |
| 4,688,900 | 8/1987 | Doane et al. | 350/347 |
| 4,728,547 | 3/1988 | Vaz et al. | 428/1 |
| 4,818,070 | 4/1989 | Gunjima et al. | 350/334 |
| 4,834,509 | 5/1989 | Gunjima et al. | 350/347 |
| 4,890,902 | 1/1990 | Doane et al. | 350/347 |
| 4,891,152 | 6/1990 | Miller et al. | 252/299 |
| 4,938,568 | 7/1990 | Margerum et al. | 350/334 |
| 4,950,052 | 8/1990 | Ferguson et al. | 428/1 |
| 4,992,201 | 2/1991 | Pearlman | 252/299.1 |
| 5,004,323 | 4/1991 | West | 350/346 |
| 5,011,624 | 4/1991 | Yamagishi et al. | 252/299 |
| 5,030,533 | 7/1991 | Bluhm et al. | 430/59 |
| 5,053,889 | 10/1991 | Nakano et al. | 358/480 |
| 5,200,108 | 4/1993 | Yuasa et al. | 252/299.01 |
| 5,268,783 | 12/1993 | Yoshinaga et al. | 359/103 |
| 5,270,843 | 12/1993 | Wang | 359/52 |

FOREIGN PATENT DOCUMENTS

| | | |
|---|---|---|
| 0272585 | 6/1988 | European Pat. Off. . |
| 0484972 | 5/1992 | European Pat. Off. . |
| 4216856 | 8/1992 | Japan . |

OTHER PUBLICATIONS

Derwent Publications Ltd., London, GB: Week 9323, AN 93–185553 & JP,A,5 113 557; 7 May 1993; Abstract.
Derwent Publications Ltd., London, GB; Week 9228, AN 92–231218 & JP,A,4 156 425; 28 May 1992; Abstract.
Derwent Publications Ltd., London, GB; Week 9301; AN 93–002884 & JP,A,4 328520; 17 Nov. 1992; Abstract.
Patent Abstracts of Japan, vol. 15, No. 140 (P–1188) 9 Apr. 1991 & JP, A,03 017 620; 25 Jan. 1991; Abstract.
Derwent Publications Ltd., London, GB; Week 9241, AN 92–336246 & JP,A,4 240 614; 27 Aug. 1992; Abstract.
Derwent Publications Ltd., London, GB; Week 9250, AN 92–412561 & JP,A,4 310 921; 2 Nov. 1992; Abstract.
Levy et al., *Materials Letters* 10:470–476 (1991).
Levy et al., *Journal of Non–Crystalline Solids*, 147–148:646–651 (1992).
West et al., *Appl. Phys. Lett.*, 60(26) (1992).
West, *ACS Symp. Ser.*, 435:475–95 (1990).

*Primary Examiner*—Shean C. Wu
*Attorney, Agent, or Firm*—Gary L. Griswold; Walter N. Kirn; Robert W. Sprague

[57] ABSTRACT

In one aspect, an optically responsive film in which liquid crystal is dispersed in a matrix that includes siloxane linkages. The film has a transmissivity at −20° C. that is substantially the same as the transmissivity at 20° C. and a $V_{90}$ at −20° C. that is less than twice the value at 20° C.

In another aspect, an optically responsive film in which liquid crystal is dispersed in a matrix that includes the polymerization product of at least one mercapto-functional siloxane.

In another aspect, an optically responsive film in which liquid crystal is dispersed in a matrix that includes the polymerization product of at least one multi-functional ene and at least one multi-functional silicon hydride.

In another aspect, an optically responsive film in which liquid crystal is dispersed in a matrix that includes the reaction product of at least one multi-functional vinyl silane and at least one multi-functional thiol.

26 Claims, 1 Drawing Sheet

LIGHT MODULATING DEVICE HAVING A SILICON-CONTAINING MATRIX

CROSS REFERENCE TO RELATED APPLICATIONS

This application is related to the following U.S. patent application which is assigned to the same assignee as the present application and hereby incorporated by reference: Miller et al., U.S. patent application Ser. No. 07/819,260, entitled "Polymer-Dispersed Liquid Crystal Device Having an Ultraviolet-Polymerizable Matrix and a Variable Optical Transmission and a Method for Preparing the Same" filed Jan. 10, 1992.

BACKGROUND OF THE INVENTION

1. Field of the Invention

This invention relates to a light modulating device (e.g., a polymer-dispersed liquid crystal device hereinafter referred to as a "PDLC device") and, more particularly, to a light modulating device which is based on an improved matrix containing silicon.

2. Description of the Related Art

Various types of light modulating devices are known. One type is the so-called PDLC device that includes an electrically responsive liquid crystal layer in which liquid crystal droplets are dispersed throughout a polymer matrix. The liquid crystal layer is prepared by combining the liquid crystal material with a polymerizable matrix precursor and then subjecting the mixture to polymerization conditions. Polymerization causes phase separation of the liquid crystal material, resulting in the formation of discrete or interconnected liquid crystal droplets dispersed throughout the polymerized matrix.

PDLC devices are translucent in the absence of an electric field due to light scattering and become transparent upon application of the field. Reverse mode PDLC devices are also known. These devices are transparent in the absence of an electric field and become translucent upon application of the field.

Various PDLC matrices are known. They include the polymerization products of epoxy, urethane, and photo-curable vinyl monomers (e.g., acrylates), respectively, as well as the reaction product of a multi-functional thiol with a multi-functional acrylate or a multi-functional allyl.

SUMMARY OF THE INVENTION

In a first aspect, the invention features an optically responsive film that includes liquid crystal dispersed in a polymer matrix that includes siloxane linkages (i.e., Si-O-Si linkages). The film has a transmissivity at $-20°$ C. that is substantially the same as the transmissivity of said film at $20°$ C., and a $V_{90}$ at $20°$ C. that is less than twice the value at $20°$ C. As used herein, $V_{90}$ refers to the switching voltage at 90% of the way to maximum transmission required to switch the film between translucent and transmissive states. For example, if the minimum transmission is 10% and the maximum transmission is 20%, the switching voltage at 90% of the way to maximum transmission is the voltage required to yield a transmission of 19%.

In preferred embodiments, the film is the polymerization product of at least one multi-functional siloxane-containing reactant. As used herein, "functional" groups are groups that participate in the polymerization reaction. A "multifunctional" reactant contains two or more of such groups, whereas a "monofunctional" reactant contains only one such group. In some preferred embodiments, the functional groups of the siloxane-containing reactant are at least three carbon atoms away from the silicon atom.

Siloxanes are generally characterized in terms of their structural units, of which there are four generally recognized types: M, D, T, and Q. M units have the general formula $R_3Si[O]$. D units have the general formula $R_2Si[O]_2$. T units have the general formula $R_1Si[O]_3$. Q units have the general formula $Si[O]_4$. The siloxane-containing reactants according to the invention are preferably linear siloxanes. Such siloxanes are made of M and D structural units.

Examples of preferred siloxane-containing reactants include mercapto-functional siloxanes, hydrosiloxanes, carbinol-functional siloxanes, epoxy-functional siloxanes, amino-functional siloxanes, isocyanato-functional siloxanes, and ene-functional siloxanes. An "ene-functional" siloxane is one in which the functional group is a polymerizable carbon-carbon double bond. Examples of suitable ene-functional siloxanes include acryloyl-functional siloxanes, methacryloyl-functional siloxanes, acrylamido-functional siloxanes, methacrylamido-functional siloxanes, allyl-functional siloxanes, vinyl-functional siloxanes, and hexenyl-functional siloxanes.

Examples of preferred mercapto-functional siloxanes include poly(3-mercaptopropylmethylsiloxane), or oligomers or copolymers thereof, and 1,1,3,3-tetramethyl-1,3-bis(3-mercaptopropyl)disiloxane.

Examples of preferred vinyl-functional siloxanes are (a) compounds having the general formula $[CH_2=CH]_xR_{3-x}SiOSiR_{3-y}[CH=CH_2]_y$ where the sum of x and y is between 2 and 6, inclusive, and R is phenyl or a lower alkyl group (e.g., having 5 or fewer carbon atoms such as methyl, ethyl, or propyl), and (b) cyclic compounds having the general formula $[[CH_2=CH]_xR_{2-x}SiO]_y$ where x is greater than zero but less than or equal to 2, y is between 3 and 6, inclusive, and R is phenyl or a lower alkyl group (e.g., having 5 or fewer carbon atoms such as methyl, ethyl, or propyl). Several different R groups falling within the above-described categories may be present in any given siloxane. Specific examples include 1,3-divinyltetramethyldisiloxane; 1,3-divinyl-1,3-diphenyl-dimethyldisiloxane; 1,1,3,3-tetravinyldimethyldisiloxane; and 1,3,5,7-tetravinyltetramethylcyclotetrasiloxane.

Also preferred are optically responsive films that are the polymerization product of (a) at least one multi-functional ene (e.g., triallyl-1,3,5-triazine-2,4,6(1H,3H,5H)-trione) and at least one multi-functional hydrosiloxane. Hydrosiloxanes are a type of silicon hydride having one or more siloxane linkages. Silicon hydrides, in turn, are silicon-containing compounds having at least one hydrogen atom attached directly to a silicon atom.

One class of preferred hydrosiloxanes has the general formula $R_{3-x}H_xSiO—[R_{2-y}H_ySiO]_n—SiR_{3-z}H_z$ where x and z are integers between 0 and 3, inclusive; y is between 0 and 2, inclusive; n is greater than or equal to zero; R is a phenyl or lower alkyl group (e.g., having 5 or fewer carbon atoms such as methyl, ethyl, or propyl); and copolymers thereof. Several different R groups falling within the above-described categories may be present in any given hydrosiloxane. Examples include 1,1,3,3-tetramethyldisiloxane and 1,3-diphenyl-1,3-dimethyldisiloxane.

A second class of preferred hydrosiloxanes has the general formula $[R_{2-x}H_xSiO]_n$ where n is between 3 and 6, inclusive; x is between 0 and 2, inclusive; and R is phenyl or a lower alkyl group (e.g., having 5 or fewer carbon atoms such as methyl, ethyl, or propyl). Several different R groups falling within the above-described categories may be present in any given hydrosiloxane. Examples include 1,3,5,7,9-pentamethylcyclopentasiloxane and 1,3,5,7-tetramethylcyclotetrasiloxane.

Also preferred are optically responsive films that are the reaction product of at least one multi-functional siloxane-containing reactant and at least one multi-functional thiol. Examples of suitable multi-functional thiols include those having the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Specific examples include trimethylolpropane tris(3-mercaptopropionate) and pentaerythritol tetra(3-mercaptopropionate).

Also preferred are optically responsive films that are the polymerization product of at least one multi-functional siloxane and at least one multi-functional silicon hydride (as defined above, which may or may not be a hydrosiloxane). One type of preferred multi-functional silicon hydride has the general formula $R_{4-x}SiH_x$ where x is an integer between 2 and 4, inclusive, and R is phenyl or a lower alkyl group (e.g., having 5 or fewer carbon atoms such as methyl, ethyl, or propyl). Several different R groups falling within the above-described categories may be present in any given silicon hydride. Examples include dimethylsilane, diphenylsilane, and methylphenylsilane.

In addition to the multi-functional siloxane-containing reactant, the matrix may further include at least one mono-functional reactant, at least one multi-functional non-siloxane containing reactant, or combinations thereof, which react together with the multi-functional siloxane-containing reactant to form the final polymerized matrix. Examples of preferred mono-functional reactants include mono-functional allyls, acrylates, methacrylates, acrylamides, methacrylamides, thiols, vinyl silanes, silicon hydrides, and combinations thereof. Examples of preferred multi-functional reactants include multi-functional allyls, acrylates, methacrylates, acrylamides, methacrylamides, vinyl silanes, silicon hydrides, thiols, and combinations thereof.

The films are preferably the ultraviolet-radiation or thermally cured polymerization products of the multi-functional siloxane-containing reactant. In the final polymerized film, the liquid crystal preferably is in the form of discrete droplets dispersed throughout the matrix. The size of the liquid crystal droplets (as measured by droplet diameter) preferably ranges from about 0.1 to 10 times the wavelength of light to be scattered. For example, if it is desired to scatter visible light having a wavelength of 550 nm, then droplet size preferably ranges from about 55–5500 nm.

Incorporating siloxane linkages (Si-O-Si) in the final film preferably enhances the low temperature properties of the film, as evidenced by the transmissivity and $V_{90}$ values. Preferably, the transmissivity of the film at $-20°$ C. is within 10% of the transmissivity of the film at 20° C.

In a second aspect, the invention features a light modulating device that includes the above-described optically responsive films and a pair of electrodes for applying an electric field to the films.

In a third aspect, the invention features an optically responsive film that includes liquid crystal dispersed in a polymer matrix that includes the polymerization product of at least one mercapto-functional siloxane reactant having at least two mercapto-functional groups. Examples of preferred mercapto-functional siloxanes include poly(3-mercaptopropylmethylsiloxane), or oligomers or copolymers thereof, and 1,1,3,3-tetramethyl-1,3-bis(3-mercaptopropyl) disiloxane. Preferably, the film has a transmissivity at $-20°$ C. that is substantially the same (e.g., within about 10%) as the transmissivity of the film at 20° C., and a $V_{90}$ that is less than twice the value at 20° C.

In a fourth aspect, the invention features an optically responsive film that includes liquid crystal dispersed in a polymer matrix that includes the polymerization product of at least one multi-functional ene and at least one multi-functional silicon hydride.

Preferred multi-functional enes include triallyl-1,3,5-triazine-2,4,6(1H,3H,5H)-trione). One class of preferred multi-functional silicon hydrides include hydrosiloxanes having the general formula (a) $R_{3-x}H_xSiO-[R_{2-y}H_ySiO]_n-SiR_{3-z}H_z$ where x and z are integers between 0 and 3, inclusive; y is between 0 and 2, inclusive; n is greater than or equal to zero; R is a phenyl or lower alkyl group (e.g., having 5 or fewer carbon atoms such as methyl, ethyl, or propyl); and copolymers thereof, and (b) $[R_{2-x}H_xSiO]_n$ where n is between 3 and 6, inclusive; x is between 0 and 2, inclusive; and R is phenyl or a lower alkyl group (e.g., having 5 or fewer carbon atoms such as methyl, ethyl, or propyl). Several different R groups falling within the above-described categories may be present in any given hydrosiloxane. Examples of preferred hydrosiloxanes include 1,1,3,3-tetramethyldisiloxane; 1,3-diphenyl-1,3-dimethyldisiloxane; 1,3,5,7,9-pentamethylcyclopentasiloxane; and 1,3,5,7-tetramethylcyclotetrasiloxane. Also preferred are silicon hydrides having the general formula $R_{4-x}SiH_x$ where x is an integer between 2 and 4, inclusive, and R is phenyl or a lower alkyl group (e.g., having 5 or fewer carbon atoms such as methyl, ethyl, or propyl. Again, several different R groups falling within the above-described categories may be present in any given silicon hydride. Examples include dimethylsilane, diphenylsilane, and methylphenylsilane. Another preferred silicon hydride is phenyltris(dimethylsiloxy)silane.

In preferred embodiments of the fourth aspect of the invention, the films are the ultraviolet-radiation or thermally cured polymerization products of the multi-functional ene and multi-functional silicon hydride. In the final polymerized film, the liquid crystal preferably is in the form of discrete droplets dispersed throughout the matrix. The size of the liquid crystal droplets (as measured by droplet diameter) preferably ranges from about 0.1 to 10 times the wavelength of light to be scattered. For example, if it is desired to scatter visible light having a wavelength of 550 nm, then droplet size preferably ranges from about 55–5500 nm. The film preferably has a transmissivity at $-20°$ C. that is substantially the same (e.g., within about 10%) as the transmissivity of the film at 20° C., and a $V_{90}$ that is less than twice the value at 20° C.

In addition to the multi-functional silicon hydride and multi-functional ene, the matrix may further include at least one mono-functional reactant, at least one multi-functional reactant different from the ene and silicon hydride, or combinations thereof, which react together with the multi-functional ene and the multi-functional silicon hydride to form the final polymerized matrix. Examples of preferred mono-functional reactants include mono-functional allyls, acrylates, methacrylates, acrylamides, methacrylamides, thiols, vinyl silanes, silicon hydrides, and combinations thereof.

In a fifth aspect, the invention features an optically responsive film that includes liquid crystal dispersed in a polymer matrix that includes the polymerization product of at least one multi-functional vinyl silane and at least one multi-functional thiol. As used herein, "vinyl silane" refers to a silicon-containing compound that has at least one vinyl group ($CH_2=CH-$) attached directly to a silicon atom.

In preferred embodiments, the stoichiometric ratio of thiol to vinyl silane ranges from about 0.5 to about 3.0; more preferably, the ratio is about 1.0.

Examples of preferred vinyl silanes include those having the general formula $[CH_2=CH]_nSiR_{4-n}$ where n is an integer between 2 and 4, inclusive, and R is phenyl or a lower alkyl group (e.g., containing 5 or fewer carbon atoms such as methyl, ethyl, or propyl). Several different R groups falling within the above-described categories may be present in any given vinyl silane. Specific examples include trivinylmethylsilane, divinyldimethylsilane, divinyldiphenylsilane, and tetravinylsilane.

Another class of preferred vinyl silanes includes vinyl siloxanes (i.e., vinyl-functional siloxanes) having the general formula $[CH_2=CH]_xR_{3-x}SiOSiR_{3-y}[CH=CH_2]_y$, where the sum of x and y is between 2 and 6, inclusive, and R is phenyl or a lower alkyl group (e.g., containing 5 or fewer carbon atoms such as methyl, ethyl, or propyl). Several different R groups falling within the above-described categories may be present in any given vinyl silane. Specific examples include 1,3-divinyltetramethyldisiloxane; 1,3-divinyl-1,3-diphenyldimethyldisiloxane; and 1,1,3,3-tetravinyldimethyldisiloxane.

A third class of preferred vinyl silanes includes cyclic vinyl siloxanes having the general formula $[[CH_2=CH]_xR_{2-x}SiO]_y$ where x is greater than zero but less than or equal to 2, y is between 3 and 6, inclusive, and R is phenyl or a lower alkyl group (e.g., containing 5 or fewer carbon atoms such as methyl, ethyl, or propyl). Several different R groups falling within the above-described categories may be present in any given vinyl silane. Specific examples include 1,3,5,7-tetravinyltetramethylcyclotetrasiloxane.

Preferred thiols have the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Specific examples include trimethylolpropane tris(3-mercaptopropionate) and pentaerythritol tetra(3-mercaptopropionate). Also preferred are thiols which are mercapto-functional siloxanes. Specific examples include poly(3-mercaptopropylmethylsiloxane), or oligomers or copolymers thereof, and 1,1,3,3-tetramethyl-1,3-bis(3-mercaptopropyl)disiloxane.

In addition to the multi-functional vinyl silane and the multi-functional thiol, the matrix may further include at least one mono-functional reactant, at least one multi-functional reactant different from the thiol and the vinyl silane, or combinations thereof, which react together with the multi-functional vinyl silane and multi-functional thiol to form the final polymerized matrix. Examples of preferred mono-functional reactants include mono-functional allyls, acrylates, methacrylates, acrylamides, methacrylamides, thiols, vinyl silanes, silicon hydrides, and combinations thereof. Examples of preferred multi-functional reactants include multi-functional allyls, acrylates, methacrylates, acrylamides, methacrylamides, silicon hydrides, and combinations thereof.

In preferred embodiments of the fifth aspect of the invention, the films are the ultraviolet-radiation or thermally cured polymerization products of the multi-functional vinyl silane and multi-functional thiol. In the final polymerized film, the liquid crystal preferably is in the form of discrete droplets dispersed throughout the matrix. The size of the liquid crystal droplets (as measured by droplet diameter) preferably ranges from about 0.1 to 10 times the wavelength of light to be scattered. For example, if it is desired to scatter visible light having a wavelength of 550 nm, then droplet size preferably ranges from about 55–5500 nm. The film preferably has a transmissivity at $-20°$ C. that is substantially the same (e.g., within about 10%) as the transmissivity of the film at 20° C., and a $V_{90}$ that is less than twice the value at 20° C.

In a sixth aspect, the invention features light modulating devices including an optically responsive film that is the polymerization product of at least one multi-functional thiol and at least one multi-functional vinyl silane.

The invention provides optically responsive films which (in the case of films having siloxane linkages) preferably exhibit good low temperature performance (as measured by transmissivity and switching voltage); thus, such films are particularly useful in light modulating windows for automotive and architectural applications. Silicon-containing films according to the invention also exhibit relatively low dielectric constants; thus, voltage can be more effectively applied to the liquid crystal droplets to switch the device between transmissive and translucent states.

The optically responsive films according to the invention can also be fabricated with selectable angles of view. Moreover, the ability to form a miscible reactant mixture at room temperature makes room temperature processing possible.

Other features and advantages of the invention will be apparent from the following description of the preferred embodiments thereof, and from the claims.

BRIEF DESCRIPTION OF THE DRAWING

The invention will be more fully understood with reference to the following drawing in which.

DESCRIPTION OF THE PREFERRED EMBODIMENTS

Figure 1:
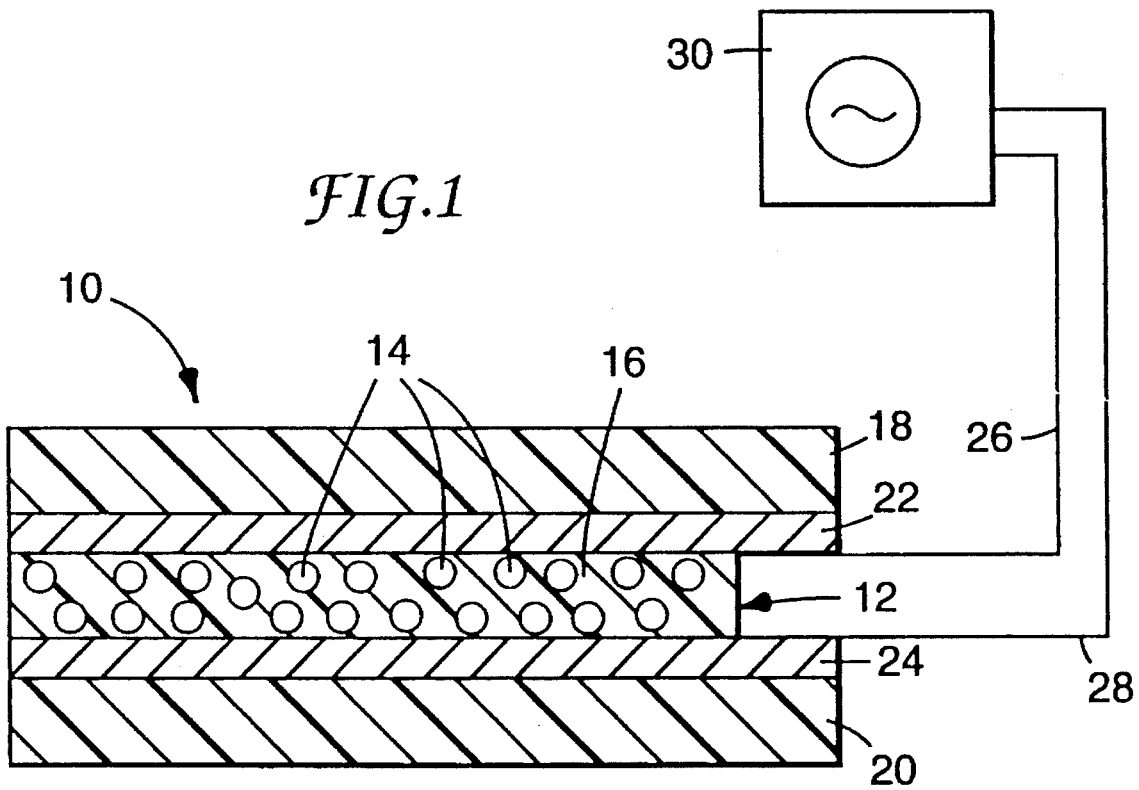
FIG. 1 is a schematic view, partially in cross-section, of a light modulating device according to the invention.

Referring to FIG. 1, there is shown a light modulating device 10 comprising an optically responsive film 12 having a multiplicity of discrete liquid crystal droplets 14 having diameters ranging from about 0.1 to 10 times the wavelength of light to be scattered dispersed in a polymeric matrix 16 that is the polymerization product of at least one multi-functional siloxane-containing reactant in which the functional groups (i.e., the groups that participate in the polymerization reaction) are preferably at least three carbon atoms removed from the silicon atom (except in the cases of (a) vinyl silanes and silicon hydrides, in which case the functional groups are attached directly to silicon, and (b) allyl silanes where the functional group ($CH_2=CH-$) is one C atom away). The resulting matrix 16 contains siloxane linkages.

Preferred multi-functional siloxane-containing reactants are set forth in the Summary of the Invention, above. They include mercapto-functional siloxanes (e.g., one or more 3-mercaptopropylmethylsiloxane units, such as poly(3-mercaptopropylmethylsiloxane), or oligomers or copolymers thereof; cyclics such as 1,3,5,7-tetrakis (3-mercaptopropyl)tetramethyltetrasiloxane; and 1,1,3,3-tetramethyl-1,3-bis(3-mercaptopropyldisiloxane); hydrosiloxanes (e.g., 1,1,3,3-tetramethyldisiloxane; 1,3,5,7,9-pentamethylcyclopentasiloxane; phenyltris(dimethylsiloxy)silane; and 1,3,5,7-tetramethylcyclotetrasiloxane); carbinol-functional siloxanes (e.g., 1,3-bis(4-hydroxybutyl)tetramethyldisiloxane and 1,3-bis(hydroxypropyl)tetramethyldisiloxane); epoxy-functional siloxanes (e.g., 1,3-bis(glycidoxypropyl)tetramethyldisiloxane); amino-functional siloxanes (e.g., 1,3-bis(4-aminobutyl)tetramethyldisiloxane and 1,3-bis(3-aminopropyl)tetramethyldisiloxane); isocyanato-functional siloxanes (e.g., 1,3-bis(3-isocyanatopropyl)tetramethyldisiloxane); and ene-functional siloxanes.

Examples of ene-functional siloxanes include acryloyl-functional siloxanes (e.g., 1,3-bis[(p-acryloxymethyl)phenethyl]tetramethyldisiloxane); methacryloyl-functional siloxanes (e.g., 1,3-bis(3-methacryloxypropyl)tetramethyldisiloxane); allyl-functional siloxanes (e.g., the hydrolysis product of allyldimethylchlorosilane); vinyl-functional siloxanes (e.g., 1,3-divinyltetramethyldisiloxane, 1,3-divinyl-1,3-diphenyl-dimethyldisiloxane, 1,1,3,3-tetravinyldimethyldisiloxane, and 1,3,5,7-tetravinyltetramethylcyclotetrasiloxane); and hexenyl-functional siloxanes (e.g., 1,3-bis(6-hex-1-enyl)tetramethyldisiloxane, which is the hydrolysis product of 6-hex-1-enyldimethylchlorosilane).

Matrix 16 may also be the polymerization product of at least one multi-functional ene (e.g., a siloxane-containing ene) and at least one multi-functional silicon hydride. The resulting product may or may not contain siloxane linkages. Preferred multi-functional enes and multi-functional silicon hydrides have the formulas set forth in the Summary of the Invention, above. In addition to the above-described hydrosiloxanes, examples of preferred multi-functional silicon hydrides include dimethylsilane, diphenylsilane, and methylphenylsilane. Preferred enes include allyls (e.g., triallyl-1,3,5-triazine-2,4,6(1H,3H,5H)-trione)), acrylates, methacrylates, acrylamides, methacrylamides, vinyl silanes, and combinations thereof.

Matrix 16 may also be the polymerization product of at least one multi-functional siloxane-containing reactant (as described above) and at least one multi-functional thiol. Preferred multi-functional thiols have the formulas set forth in the Summary of the Invention, above. Examples of preferred thiols include trimethylolpropane tris(3-mercaptopropionate) and pentaerythritol tetrakis(3-mercaptopropionate).

Matrix 16 may also be the polymerization product of at least one multi-functional thiol and at least one multi-functional vinyl silane. The resulting matrix may or may not contain siloxane linkages. Preferred multi-functional thiols and multi-functional vinyl silanes have the formulas set forth in the Summary of the Invention, above. Examples of preferred thiols include trimethylolpropane tris(3-mercaptopropionate) and pentaerythritol tetrakis(3-mercaptopropionate), as well as mercapto-siloxanes such as poly(3-mercaptopropylmethylsiloxane) (or oligomers or copolymers thereof) and 1,1,3,3-tetramethyl-1,3-bis(3-mercaptopropyl)disiloxane; the mercapto-siloxanes are particularly preferred. Examples of preferred multi-functional vinyl silanes include trivinylmethylsilane, 1,3-divinyltetramethyldisiloxane, 1,3-divinyl-1,3-diphenyl-dimethyldisiloxane, divinyldimethylsilane, divinyldiphenylsilane, 1,1,3,3-tetravinyldimethyldisiloxane, tetravinylsilane, and 1,3,5,7-tetravinyltetramethylcyclotetrasiloxane.

Various mono-functional and multi-functional reactants may be incorporated into the polymer materials described hereinabove to usefully adjust the physical characteristics thereof. For example, such compounds may be included to adjust the refractive index of the polymer matrix material relative to the refractive index of the liquid crystal material. In general, it is desirable that the refractive index of the polymerized matrix (including dissolved liquid crystal) match the ordinary index of refraction ($n_o$) of the liquid crystal material.

Useful mono-functional and multi-functional reactants include enes such as acrylates, methacrylates, allyls, acrylamides, methacrylamides, vinyl silanes, silicon hydrides, or combinations thereof.

Examples of mono-functional acrylates and methacrylates include acrylate and methacrylate esters of non-tertiary alkyl alcohols, the molecules of which have from 1 to about 14 carbon atoms. Included within this class of monomers are, for example, isooctyl acrylate, isononyl acrylate, 2-ethyl hexyl acrylate, decyl acrylate, dodecyl acrylate, n-butyl acrylate, and hexyl acrylate.

Examples of multi-functional acrylates and methacrylates include 1,6hexanedioldiacrylate, trimethylpropane triacrylate, and propylene glycol dimethacrylate.

Examples of mono- and multi-functional allyls include mono-, di-, and triallyl compounds and allyl compounds containing an hydroxyl group reacted with a mono- or multi-functional isocyanate, e.g., triallyl isocyanurate, trimethylolpropane diallyl ether, allyl benzene, allylcyclohexane, diallydiphenylsilane, and allylated urethane oligomers such as 9460 commercially available from Monomer-Polymer & Dajac Laboratories, Inc., Trevose, Pa.

Examples of mono-functional acrylamides and methacrylamides include N,N-dimethylacrylamide, N,N-diethylacrylamide, N-dodecylmethacrylamide, and N-ethylmethacrylamide.

Examples of multi-functional acrylamides and methacrylamides include 1,6-hexamethylenebisacrylamide, N,N'-octamethylenebisacrylamide, 1,6-hexamethylenebismethacrylamide, N,N-isovalerylidenebismethacrylamide, and mxylenebisacrylamide.

Examples of mono-functional silicon hydrides include trimethylsilane and dimethylphenylsilane.

Also useful in the invention are reactive oligomers, such as allyl or (meth)acrylated oligomers of polyurethanes, polyesters, polyols, polybutadienes, or epoxies. An example of a suitable acrylated polybutadiene is SARTOMER CD 5000 (commercially available from Sartomer Co.). A useful acrylated polyester is SARTOMER 609 (front Sartomer Co.) and a suitable acrylated polyurethane is SARTOMER 9610 (Sartomer Co.). Other useful acryl oligomers include those sold under the trade name "Ebecryl" by Radcure Specialties.

Other useful reactants include mono-functional thiols and vinyl silanes, e.g., isooctyl 3-mercaptopropionate, vinyltrimethylsilane, vinyltrimethoxysilane, and vinyltris(dimethylsiloxy)silane.

Other materials that may be added to the reaction mixture include UV polymerizable systems based on thiol-ene chemistry in which either a multi-functional allyl or multi-functional acrylate or methacrylate reacts with a multi-functional thiol. Commercially available materials include NOA 65 and NOA 68, each of which includes a photoinitiator and is available from Norland Products, Inc. New Brunswick, N.J.

Liquid crystal materials useful in forming the droplets 14 may be nematic, smectic, or cholesteric. Furthermore, they may have either positive or negative dielectric anisotropy.

Particularly preferred (in the case of light modulating devices for automotive and architectural applications) are nematic liquid crystals having positive dielectric anisotropy. Commercially useful examples of such liquid crystals include LICRISTAL E7, BL006, BL009, ML1005, ML1008, 17151, 17153, 17315, 17722 (sometimes available under the trade designation BL038), and 17723 (sometimes available under the trade designation BL036), all of which are available from EM Industries, Hawthorne, N.Y. Mixtures of these liquid crystal materials may also be used.

Formation of an optically responsive film according to the invention is typically carried out in a phase separation process. Polymerization induced-phase separation has been found to be useful when the uncured polymer matrix material is miscible with a low molecular weight liquid crystal material. One particular advantage offered by the matrix-forming reactants of the present invention is that in many cases they, together with the liquid crystal, form a miscible mixture at room temperature, making room temperature processing possible. Liquid crystal droplets form when the solubility of the liquid crystal material in the polymer matrix material decreases as a result of an increase in the molecular weight of the matrix material that occurs when the matrix material polymerizes to form a continuous phase. As the solubility of the liquid crystal material decreases, it phase separates from the polymer matrix material and forms droplets. The droplets increase in size until the polymer matrix material locks in the final droplet morphology. The polymerization is carried out in the presence of the liquid crystal material, thereby enabling tailoring of the polymer matrix material in terms of molecular weight, crosslink density, liquid crystal compatibility, and/or adhesion.

Phase separation of the liquid crystal material upon polymerization of the uncured polymer matrix material to form a dispersion of droplets in the matrix material may be enhanced by the addition of a filler such as finely divided silica having a B.E.T. surface area of at least 10 $m^2/g$ (preferably 50 to 400 $m^2/g$) to the polymerizable matrix material prior to the addition of the liquid crystal material. Fumed or precipitated silica of either the hydrophobic or hydrophilic type may be used. The amount of silica will vary depending on the particular liquid crystal and polymer matrix materials. Generally about 0.1 to 5 (preferably 0.5 to 2) weight percent silica based on the weight of the polymer matrix material is effective. An example of a commercially available hydrophobic fumed silica which is useful in the invention is AEROSIL R 972 (available from Degussa Corp.). An example of a commercially available hydrophilic fumed silica is CAB-O-SIL M-5 (available from Cabot Corp., Cab-O-Sil Division, Tuscola, Ill.).

Although many reactant/liquid crystal combinations according to the invention form miscible mixtures at room temperature, in others it may be necessary to heat the combination slightly to form a homogeneous solution and prevent premature phase separation.

Matrix 16 is preferably prepared by photo-initiated polymerization of the reactants using low intensity UV radiation. Useful photoinitiators include the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl) oxime. Generally, the amount of photoinitiator is from about 0.01 part to about 10 parts per 100 parts monomer weight.

Other radical polymerization initiating systems which may be used include 2,4-bistrichloro-methyl-6-substituted-s-triazines, and benzophenone with an amine, for example, benzophenone and p-(N,N-diethylamino) ethyl benzoate.

Low intensity UV lamps with different spectral responses are commercially available and may be used. The lamp should be selected such that the maximum output of the lamp is near the maximum absorption of the initiator. Preferably, fluorescent lamps in which the intensity of each lamp bank is in the range of about 0.25 to 10 $mW/cm^2$ (more preferably in the range of about 0.5 to 5 $mW/cm^2$) are used. The total radiation to which the matrix reactants are exposed preferably is in the range of about 100 to 1500 $mJ/cm^2$. The particular radiation intensity and total energy exposure requirements will vary depending on the liquid crystal, initiator, and polymer matrix materials.

Preferably, the liquid crystal material and the polymer matrix material are provided in approximately equal parts by weight, although the parts by weight of the liquid crystal material can vary from 10–90% by weight, even more preferably from 25–75% by weight.

Referring again to FIG. 1, although the optically responsive film 12 may be provided in free-standing form, in many applications it will be desirable to provide a sandwichlike construction in which the film 12 is interposed between a pair of first and second substrates 18 and 20, respectively. The thickness of the film preferably ranges from about 5 to 25 μm, more preferably in the range of about 10 to 25 μm, and most preferably in the range of about 15 to 21 μm. It will be understood that the device 10 may be provided with only a single substrate if, for example, the device is to be applied to a motor vehicle sunroof or an architectural window in which case the sunroof or the window have a function analogous to that of the second substrate.

Preferably, at least one of the substrates 18 and 20 is at least partially transparent to allow incident visible light to pass therethrough. One of the substrates (preferably the one which light first impinges) may be modified to have selective light transmission characteristics, for example, to selectively transmit light of a wavelength corresponding to a certain color of the visible spectrum, ultraviolet light, or infrared light. Materials suitable for the substrates 18 and 20 include glass (which may be tempered) and plastics such as polyester (or a copolyester), polyethersulfone, polyimide, polyethylene terephthalate, polyethylene naphthalate, poly-(methyl methacrylate), and polycarbonate. The substrates may be treated so as to enhance their abrasion and scratch resistance. The substrates are typically about 25 to 50 μm thick for flexible, durable constructions, although they may range in thickness from 1 μm to greater than 250 μm. If glass is employed for at least one of the substrates, a thickness in excess of 250 μm may be useful.

With continued reference to FIG. 1, in order to induce a change in the orientation of the liquid crystal droplets so as to cause the optically responsive film 12 to switch between the translucent off-state and the transparent on-state, it is necessary to apply an electric field across the film 12 (the film 12 may also be switched by applying a magnetic field across the same or by raising the temperature of the film above the clearing point temperature of the encapsulated liquid crystal). Accordingly, the device 10 may further comprise first and second electrodes 22 and 24, respectively, which are positioned intermediate the substrates 18 and 20 and the optically responsive film 12. The electrodes 22 and 24 are connected to, respectively, first and second leads 26 and 28 (e.g., using the connector described in Engfer et al., U.S. Ser. No. 08/011,973 entitled "Electrical Connector" filed Feb. 1, 1993 which is assigned to the same assignee as the present application and hereby incorporated by reference) which, in turn, are electrically connected to a variable power supply 30, preferably of the alternating current type (e.g., a zero-cross power supply). Preferably, the frequency of the alternating field should be in the range of 40 to 100 Hz. The field should alternate sufficiently rapidly so that a human observer of the device cannot perceive flickering. Thus, upon application of an electric field across the film 12, the optic axes of the liquid crystal droplets become aligned. If the refractive indices of the liquid crystal material and the polymer matrix material have been closely matched, the film 12 will switch between the translucent off-state and the transparent on-state.

The electrodes 22 and 24 may be formed of various materials including chromium, indium oxide, tin oxide, stainless steel, indium tin oxide, gold, silver, copper, aluminum, titanium, cadmium stannate, other transition metal oxides, and mixtures and alloys thereof. With the use of certain electrode materials (e.g., silver) it may be desirable to environmentally protect the same with a thin passivating dielectric layer. The use of such a protective layer may enhance the ability of the electrode to resist thermal, chemical, moisture and/or ultraviolet-induced degradation such as is disclosed in Gilbert et al., U.S. patent application Ser. No. 07/819,274 entitled "Light Modulating Devices Incorporating an Improved Electrode" filed Jan. 10, 1992, which is assigned to the same assignee as the present application and hereby incorporated by reference. The electrodes must be capable of receiving an electrical input from the leads 26 and 28 and transmitting the same so as to apply an electric field across the film 12. Preferably the electrodes 22 and 24 are positioned adjacent to opposite sides or surfaces of the film 12 and extend over, across and parallel to the same.

At least one of the electrodes 22 and 24 preferably comprises a conductive coating that is at least partially transparent to visible light, although electrodes which provide preferential light transmission characteristics, such as color tint or ultraviolet or infrared filter, may be used. The electrodes 22 and 24 need not be equally transparent. At least one of the electrodes should provide a visible light transmission of at least 1%, preferably at least 10%, and more preferably at least 50%. The electrode coating should have a conductivity greater than 0.001 mhos per square. The electrode material may be coated or otherwise applied to the first and second substrates 18 and 20.

In operation, a user of the device 10 applies an electric field across the film 12 using power supplied by power supply 30, thereby rendering the device transmissive to light. The inventors have discovered that by incorporating siloxane linkages into the polymer matrix (e.g., through polymerization of a multi-functional siloxane-containing reactant), the low temperature transmissivity of the device is preferably improved. Specifically, the transmissivity of the film at −20° C. is substantially the same (e.g., preferably within 10%) as the transmissivity of the film at 20° C., and the switching voltage at 90% of the way to maximum transmission (i.e., $V_{90}$) at −20° C. is less than twice the value at 20° C.

Whether the light modulating device is supplied as a free-standing film, with one substrate, or with two substrates, the device may be applied to a surface such as a motor vehicle sunroof, a motor vehicle side window, or an architectural window with, for example, suitable adhesive; preferably, the adhesive is optically transparent. As the device switches between the translucent off-state and the transparent on-state (in the case of nematic liquid crystal material having positive dielectric anisotropy), the device preferably has a uniform, even appearance.

The invention will be more fully understood with references to the following examples which are not to be construed as limiting the scope of the invention.

EXAMPLES

PDLC DEVICE COMPONENTS

Vinyl Silanes

Divinyldimethylsilane [D6206.5]—Available from Hüls America, Inc. Piscataway; N.J.

Divinyldiphenylsilane [7982]—Available from Monomer-Polymer & Dajac Laboratories, Inc., Trevor, Pa.

1,3-Divinyl-1,3-diphenyl-1,3-dimethyldisiloxane [D6206.9]—Available from Hüls America, Inc.

1,3-Divinyltetramethyldisiloxane [D6210]—Available from Hüls America, Inc.

Trivinylmethylsilane [T4260]—Available from Hüls America, Inc.

Tetravinylsilane [T2150]—Available from Hüls America, Inc.

1,1,3,3-Tetravinyldimethylsiloxane [T2145]—Available from Hüls America, Inc.

1,3,5,7-tetravinyltetramethylcyclotetrasiloxane [T2160] —Available from Hüls America, Inc.

Thiols

Pentaerythritol tetrakis(3-mercaptopropionate) [PETMP] —Available from Aldrich Chemical, Milwaukee, Wis.

Trimethylolpropane tris(3-mercaptopropionate) [TMPTMP]—Available from Aldrich Chemical.

Poly(3-mercaptopropylmethylsiloxane) [PS927]—Available from Hüls America, Inc.

1,1,3,3-Tetramethyl-1,3-bis(3-mercaptopropyl)disiloxane [T1995]—Available from Hüls America, Inc.

Modified PS927—Thiol was modified by stirring a mixture of PS927 (10.01 g), hexamethyldisiloxane (1.39 g), decolorizing carbon (0.053 g), and conc. sulfuric acid (0.018 g) overnight at ambient conditions. The resulting reaction mixture was filtered through a 0.45 micron filter to remove the decolorizing carbon and used without further purification.

Liquid Crystal Materials

E7—A nematic liquid crystal mixture. Available from EM Industries, Hawthorne, N.Y.

BL009—A nematic liquid crystal mixture. Available from EM Industries, Hawthorne, N.Y.

BL036—A nematic liquid crystal mixture. Available from EM Industries, Hawthorne, N.Y.

Photoinitiators

Benzophenone—Available from Aldrich Chemical.

Irgacure 651—Benzildimethyl ketal. Available from Ciba Geigy Corp., Oak Brook, Ill.

KB-1—(Benzildimethyl ketal, equivalent to Irgacure 651)—Available from Sartomer, Newton Square, Pa.

Thermal Initiator

Vazo 52—2,2'-azobis(2,4-dimethylvaleronitrile)—Available from DuPont Chemicals, Wilmington, Del.

Electrode Materials

Indium Tin Oxide (ITO) coated glass—2 mm thick glass having an ITO coating with a 150Ω/sq on one face, available from OCLI, Santa Rosa, Calif.

A 0.05 mm (2 mm) thick biaxially oriented poly(ethylene terephthalate) film having a 10–15 nm thick Ag electrode with a 45 nm thick $Al_2O_3$ passivating overcoat on one face. Prepared as described in the aforementioned Gilbert et al. application.

Device Preparation

The PDLC devices utilizing PET based electrode materials were coated by placing a puddle of unpolymerized monomer/LC blend between two PET films 15.24 cm (6 in.) wide, with their electrode coated surfaces in a facing relationship, and pulling the electrode/unpolymerized matrix/LC construction between a pair of nip rollers of a precision roll coater apparatus. The roll gap was typically set between 0.11–0.14 mm (4.5–5.5 mils) to accommodate the thickness of the electrode materials and to allow for the desired PDLC matrix thickness. After exiting the nip rollers, the sandwich-like construction was passed between two opposed banks of fluorescent, low intensity UV lamps contained in a temperature controlled chamber to polymerize the matrix material. The average intensity of the UV irradiation was measured with a Uvirad Model UR365-US1CH3 available from Electronic Instrumentation & Technology, Sterling, Va.

PDLC devices utilizing ITO coated glass electrodes were prepared by depositing the uncured matrix/LC blend on the electrode coated surface of an ITO coated glass slide (nominally 5 cm×6 cm) having a 0.025 mm thick spacer ring around its perimeter, placing a second glass electrode over the first electrode with the electrode coated surface in contact with the uncured monomer/LC blend, applying sufficient pressure to uniformly spread the unpolymerized blend between the two electrodes and curing the resulting construction on a hot plate under a long wave ultraviolet lamp (Fisher Scientific). The average intensity of the UV irradiation was measured with a Ushio UniMeter, Model UIT-101 equipped with a 65 nm sensor.

Device Characterization

The PDLC devices were characterized by visual appearance; haze, as determined using Perkin Ehner Lambda 9 Spectrophotometer equipped with an integrating sphere at 550 nm; and glass transition temperature range, as measured by Differential Scanning Calorimetry (DSC) at 10° C./min. The devices were connected to the leads from a Kepco 125-1KVA-3T power supply by a connector such as that described in the aforementioned Engfer et al. application. PDLC device performance was characterized by increasing the voltage to the devices while monitoring the transmission of photopically-filtered light at an approximate 6° collection half angle with a Dyn-Optics Optical Monitor 590 and the power, current, and voltage with a Valhalla Scientific 2300 Series Digital Power Analyzer. For voltages greater than approximately 130 volts AC (VAC), a Kepco BOP 1000M amplifier was interposed between the power supply and the PDLC device. The dielectric constant of the PDLC was calculated by fitting the impedance and phase angle data over a frequency range from 20 up to 2000 Hz and 120 VAC to an equivalent circuit model consisting of a resistor in series with a parallel resistor and capacitor; and/or measuring the impedance at 20, 60, and 100 Hz and calculating the values of the capacitor and series and parallel resistors from the measured impedances.

EXAMPLE 1

A PDLC device was assembled from several drops of a homogeneous monomer/LC blend consisting of divinyldimethylsilane (0.0571 g), pentaerythritol tetrakis(3-mercaptopropionate) (0.1181 g), pentaerythritol tetrakis(3-mercaptopropionate) containing 2% by weight Irgacure 651 (0.0198 g) and E7 (0.1870 g) which were placed on the electrode surface, precision coated and cured as previously described. The resulting construction was cured for 4 minutes at an intensity of 1.9–2.0 mW/cm$^2$ at 25.2° C. (77.4° F). The PDLC device had a thiol/ene stoichiometric ratio of 1.07 and contained 49% by weight liquid crystal material. Performance parameters of the cured PDLC device are reported in Table 1.

EXAMPLE 2

A PDLC device was prepared according to the procedure of Example 1 except that the monomer/LC blend consisted of divinyldiphenylsilane (0.1242 g), pentaerythritol tetrakis(3-mercaptopropionate) containing 2% by weight Irgacure 651 (0.1460 g) and E7 (0.1374 g). The thiol/ene stoichiometric ratio was 1.07 and the composition contained 33.7% by weight liquid crystal material. The sample was cured for 4 minutes at an intensity of 2.0 mW/cm$^2$ at room temperature to produce an almost transparent device 0.015 mm (0.6 mm) thick having a nonuniform streaked appearance. Performance parameters of the cured PDLC device are reported in Table 1.

EXAMPLE 3

A PDLC device was prepared according to the procedure of Example 1 except that the monomer/LC blend consisted of 1,3-divinyltetramethyldisiloxane (0.409 g), trimethylolpropane tris(3-mercaptopropionate) containing 0.5% by weight Irgacure 651 (0.591 g)and E7 (1.004 g). The thiol/ene stoichiometric ratio was 1.00 and the composition contained 50.1% by weight liquid crystal material. The sample was cured at an intensity of 0.17 mW/cm$^2$ at room temperature. The PDLC device maintained relatively constant on-state transmission down to −30° C. when powered at 100 VAC, 60 Hz. Performance parameters of the cured PDLC device are reported in Table 1.

EXAMPLE 4

A PDLC device was prepared according to the procedure of Example 1 except that the monomer/LC blend consisted of 1,3-divinyltetramethyldisiloxane (0.100 g), poly(3-mercaptopropylmethylsiloxane) containing 0.063% by weight Irgacure 651 (0.412 g) and E7 (0.254 g). The thiol/ene stoichiometric ratio was 2.85 and the composition contained 33.2% by weight liquid crystal material. The sample was cured for 3 minutes at an intensity of 2.0 mW/cm$^2$ at 26° C. (78° F). Performance parameters of the cured PDLC device are reported in Table 1.

EXAMPLE 5

A PDLC device was prepared according to the procedure of Example 1 except that the monomer/LC blend consisted of 1,3-divinyltetramethyldisiloxane (0.206 g), trimethylolpropane tris(3-mercaptopropionate) containing 0.5% by weight Irgacure 651 (0.296 g) and E7 (1.504 g). The thiol/ene stoichiometric ratio was 0.99 and the composition contained 75% by weight liquid crystal material. The sample was cured for 3 minutes at an intensity of 2.0 mW/cm$^2$ at 26° C. (78° F.) to produce a device 0.015 mm (0.6 mils) thick. Performance parameters of the cured PDLC device are reported in Table 1.

EXAMPLE 6

A PDLC device was prepared according to the procedure of Example 1 except that the monomer/LC blend consisted of 1,3-divinyltetramethyldisiloxane (0.091 g), modified poly(3-mercaptopropylmethylsiloxane) containing 0.6% by weight Irgacure 651 (0.157 g) and BL036 (0.252 g). The thiol/ene stoichiometric ratio was 1.06 and the composition contained 50.4% by weight liquid crystal material. The sample was cured at an intensity of 1.8 mW/cm$^2$ at 50°–51° C. (122°–124° F.) to produce a device 0.023 mm (0.9 mm thick). The PDLC device maintained relatively constant on-state transmission down to −25° C. when powered at 100 VAC, 60 Hz. Performance parameters of the cured PDLC device are reported in Table 1.

EXAMPLE 7

A PDLC device was prepared according to the procedure of Example 1 except that the monomer/LC blend consisted of 1,3-divinyl-1,3-diphenyl-1,3-dimethyldisiloxane (3.1156 g), pentaerythritol tetrakis(3-mercaptopropionate) containing 8% by weight benzophenone (2.7867 g) and E7 (5.8171 g). The thiol/ene stoichiometric ratio was 1.01 and the composition contained 49.6% by weight liquid crystal material. The sample was cured for 4 minutes at an intensity of 2.0 mW/cm$^2$ at 23° C. (74° F.) to produce a device having a non-uniform appearance. The PDLC device maintained relatively constant on-state transmission down to −30° C. when powered at 100 VAC, 60 Hz. Additionally, the powered PDLC device has less specular transmission when looking through the film at normal incidence than at an angle less than 30° C. from the normal incidence. Performance parameters of the cured PDLC device are reported in Table 1.

EXAMPLE 8

A PDLC device was prepared according to the procedure of Example 1 except that the monomer/LC blend consisted of trivinylmethylsilane (0.117 g), trimethylolpropane tris(3-mercaptopropionate) containing 0.5% by weight Irgacure 651 (0.383 g) and BL009 (0.503 g). The thiol/ene stoichiometric ratio was 1.00 and the composition contained 50.1% by weight liquid crystal material. The sample was cured at an intensity of 0.3 mW/cm$^2$ at 27° C. (80° F.) to produce a device 0.020 mm (0.8 mm) thick. Performance parameters of the cured PDLC device are reported in Table 1.

EXAMPLE 9

A PDLC device was prepared according to the procedure of Example 1 except that the monomer/LC blend consisted of tetravinylsilane (0.109 g), pentaerythritol tetrakis(3-mercaptopropionate) containing 0.5% by weight Irgacure 651 (0.396 g) and BL009 (0.500 g). The thiol/ene stoichiometric ratio was 0.98 and the composition contained 49.8% by weight liquid crystal material. The sample was cured at an intensity of 2.0 mW/cm$^2$ at 48° C. (118° F.) to produce a device 0.013 mm (0.5 mm) thick. Performance parameters of the cured PDLC device are reported in Table 1.

EXAMPLE 10

A PDLC device was prepared according to the procedure of Example 1 except that the monomer/LC blend consisted of 1,1,3,3-tetravinyldimethyldisiloxane (0.0532 g), pentaerythritol tetrakis(3-mercaptopropionate) (0.1051 g) , pentaerythritol tetrakis(3-mercaptopropionate) containing 2% by weight Irgacure 651 (0.0206 g) and E7 (0.1790 g). The thiol/ene stoichiometric ratio was 0.98 and the composition contained 50% by weight liquid crystal material. The sample was cured for 4 minutes at an intensity of 1.9–2.0 mW/cm$^2$ at 25° C. (77.4° F.). Performance parameters of the cured PDLC device are reported in Table 1.

EXAMPLE 11

A PDLC device was prepared by placing a few drops of a homogeneous monomer/LC blend consisting of 1,3,5,7-tetravinyltetramethylcyclotetrasiloxane (0.1758 g), 1,1,3,3-tetramethyl-1,3-bis(3-mercaptopropyl)disiloxane containing 0.5% by weight KB-1 (0.2814 g) and BL036 (0.4517 g) on the electrode coated surface of an ITO coated glass slide (nominally 5 cm×6 cm) having a 0.025 mm thick spacer ring around its perimeter, placing a second glass electrode over the first electrode with the electrode-coated surface in contact with the uncured monomer/LC blend, applying sufficient pressure to uniformly spread the unpolymerized blend between the two electrodes and curing the resulting construction for 4 minutes at an intensity of 0.5 mW/cm$^2$ at room temperature. The thiol/ene stoichiometric ratio was 0.97 and the composition contained 49.7% by weight liquid crystal material. Performance parameters of the cured PDLC device are reported in Table 1.

EXAMPLE 12

A PDLC device was prepared according to the procedure of Example 11 except that the monomer/LC blend consisted of KB-1 (0.0058 g) added to 1.0426 g of a mixture consisting of 0.0081 g of additional KB-1 combined with 1.2216 g of a mixture consisting of 1,3-divinyltetramethyldisiloxane (0.2996 g), 1,3-divinyl-1,3-diphenyl-1,3-dimethyldisiloxane (0.1664 g), poly(3-mercaptopropylsiloxane) containing 0.5% by weight KB-1 (0.6000 g) and BL036 (0.3553 g). The thiol/ene stoichiometric ratio was 1.00 and the composition contained about 25% by weight liquid crystal material. The sample was cured at an intensity of 1 mW/cm$^2$ at 22° C. (72° F.). Performance parameters of the cured PDLC device are reported in Table 1.

EXAMPLE 13

A PDLC device was prepared according to the procedure of Example 1 except that the monomer/LC blend consisted of 1,3-divinyltetramethyldisiloxane (0.2520 g), 1,3-divinyl-1,3-diphenyl-1,3-dimethyldisiloxane (0.1413 g), poly(3-mercaptopropylmethylsiloxane) (0.4984 g), KB-1 (0.0138 g), and BL036 (0.4467 g). The thiol/ene stoichiometric ratio was 0.99 and the composition contained 33% by weight liquid crystal material. The sample was cured at an intensity of 0.6 mW/cm$^2$ at 26° C. (79° F.). The PDLC device had an on-state transmission of 32.6% when powered at 120 VAC, 60 Hz at −32° C. Performance parameters of the cured PDLC device are reported in Table 1.

EXAMPLE 14

A PDLC device was prepared according to the procedure of Example 11 except that the monomer/LC blend consisted of KB-1 (0.0276 g) added to 0.4612 g of a mixture consisting of an additional 0.0483 g of KB-1 combined with a mixture consisting of 1,3-divinyltetramethyldisiloxane (0.0995 g), trimethylolpropane tris(3-mercaptopropionate) containing 4% by weight KB-1 (0.0606 g), 1,1,3,3- tetramethyl-1,3-bis(3-mercaptopropyl)disiloxane containing 4% by weight KB-1 (0.0975 g), and BL036 (0.3827 g). The thiol/ene stoichiometric ratio was 0.99 and the composition contained about 60% by weight liquid crystal material. The sample was cured at an intensity of 1 mW/cm$^2$ at 35° C. (95° F.). Performance parameters of the cured PDLC device are reported in Table 1.

EXAMPLE 15

A PDLC device was prepared according to the procedure of Example 11 except that the monomer/LC blend consisted of 1,3-divinyltetramethyldisiloxane (0.1031 g), Grace RCC-15C (0.3997 g, an allyl/thiol mixture available from W. R. Grace Co., Atlanta, Ga.), and EL036 (0.5092 g). The thiol/ene stoichiometric ratio was not known and the composition contained about 50.3% by weight liquid crystal material. The PDLC device maintained relatively constant on-state transmission down to –20° C. when powered at 120 VAC, 60 Hz. Performance parameters of the cured PDLC device are reported in Table 1.

EXAMPLE 16

A PDLC device was prepared according to the procedure of Example 1 except that the monomer/LC blend consisted of 2.43 g of a mixture consisting of 1,3-divinyltetramethyl-disiloxane (0.35 g), trimethylolpropane tris(3-mercaptopropionate) (1.00 g), 1,6-hexanediol diacrylate (0.43g, available from Aldrich), KB-1 (0.02 g), and EL036 (1.81 g) plus an additional 0.02 g of KB-1. The thiol/ene stoichiometric ratio was 0.98 and the composition contained about 49.7% by weight liquid crystal material. The sample was cured for 2 minutes at an intensity of 1.5 mW/cm$^2$ at 22° C. (72° F.). Performance parameters of the cured PDLC device are reported in Table 1.

EXAMPLE 17

A PDLC device was prepared according to the procedure of Example 1 except that the monomer/LC blend consisted of 0.46 g of EL036 and 0.55 g of a mixture consisting of 1,3-divinyltetramethyldisiloxane (2.80 g), 1,3-divinyl-1,3-diphenyl-1,3-dimethyldisiloxane (1.56 g), KB-1 (0.21 g), and methylhydroquinone (0.00106 g, available from Aldrich). The thiol/ene stoichiometric ratio was 1 and the composition contained 46% by weight liquid crystal material. The sample was cured for 4 minutes at an intensity of 1.5 mW/cm$^2$ at 22° C. (72° F.). The PDLC device maintained relatively constant on-state transmission down to –30° C. when powered at 120 VAC, 60 Hz. Performance parameters of the cured PDLC device are reported in Table 1.

EXAMPLE 18

A PDLC device was prepared according to the procedure of Example 11, except that the monomer/LC blend consisted of pentaerythritol tetraacrylate (0.1593 g, available from Sartomer), modified poly(3-mercaptopropylmethylsiloxane) containing an unrecorded amount of Irgacure 651 (0.3321 g), 1-decene (0.0046 g, available from Aldrich), and BL036 (0.5021 g). The thiol/ene stoichiometric ratio was 1.03 and the composition contained 50.3% by weight liquid crystal material. The sample was cured at an intensity of 1 mW/cm$^2$ at 38° C. (100° F.). The PDLC device maintained relatively constant on-state transmission down to –30° C. when powered at 100 VAC, 60 Hz. Performance parameters of the cured PDLC device are reported in Table 1.

EXAMPLE 19

A PDLC device was prepared according to the procedure of Example 11, except that the monomer/LC blend consisted of triallylo 1,3,5-triazine-2,4,6(1H,3H,5H)-trione (0.1775 g, available from Aldrich), modified poly(3-mercaptopropylsiloxane) containing an unrecorded amount of Irgacure 651 (0.1775 g), and BL036 (0.3276 g). The thiol/ene stoichiometric ratio was 1.00 and the composition contained 50.5% by weight liquid crystal material. The sample was cured at an intensity of 1 mW/cm$^2$ at 21° C. (70° F.). Performance parameters of the cured PDLC device are reported in Table 1.

EXAMPLE 20

A PDLC device was prepared according to the procedure of Example 11, except that the monomer/LC blend consisted of trimethylolpropane trimethacrylate (0.2305 g, available from Sartomer), modified poly(3-mercaptopropylmethylsiloxane) containing an unrecorded amount of Irgacure 651 (0.3143 g), and BL036 (0.5497 g). The thiol/ene stoichiometric ratio was 1.01 and the composition contained 50.2% by weight liquid crystal material. The sample was cured at an intensity of 6 mW/cm$^2$ at 49° C. (120° F.). Performance parameters of the cured PDLC device are reported in Table 1.

EXAMPLE 21

A PDLC device was prepared according to the procedure of Example 11, except that the monomer/LC blend consisted of triallyl-1,3,5-triazine-2,4,6(1H,3H,5H)-trione (0.2804 g, available from Aldrich), pentamethylcyclopentasiloxane (0.2026 g, available from Hüls America), E7 (0.4840 g) and the photocatalyst cyclopentadienyltrimethyl platinum (0.0013 g, internal preparation) and smaller 2.5 cm by 3 cm ITO-coated glass was used. The hydride/ene stoichiometric ratio was 1.00 and the composition contained 50.1% by weight liquid crystal material. The sample was cured for approximately 2 hours at an intensity of 1 mW/cm$^2$ at room temperature. Performance parameters of the cured PDLC device are reported in Table 1.

EXAMPLE 22

A PDLC device was prepared according to the procedure of Example 11, except that the monomer/LC blend consisted of triallyl-1,3,5-triazine-2,4,6(1H,3H,5H)-trione (0.1730 g, available from Aldrich), phenyltris(dimethylsiloxy)silane (0.2026 g, available from Hüls America), E7 (0.3538 g) and the photocatalyst cyclopentadienyltrimethyl platinum (0.0011 g, made internally at 3M) and smaller 2.5 cm by 3 cm ITO-coated glass was used. The hydride/ene stoichiometric ratio was 0.88 and the composition contained 48.5% by weight liquid crystal material. The sample was cured for approximately 2 hours at an intensity of 1 mW/cm$^2$ at room temperature. Performance parameters of the cured PDLC device are reported in Table 1.

EXAMPLE 23

A PDLC device was prepared according to the procedure of Example 11, except that the monomer/LC blend consisted of triallyl-1,3,5-triazine-2,4,6(1H,3H,5H)-trione (0.2837 g, available from Aldrich), 1,3,5,7-tetramethylcyclotetrasiloxane (0.2062 g, available from Hüls America), E7 (0.4908 g) and the photocatalyst cyclopentadienyltrimethyl platinum (0.0014 g, made internally at 3M) and smaller 2.5 cm by 3 cm ITO-coated glass was used. The hydride/ene stoichiometric ratio was 1.00 and the composition contained 50.0% by weight liquid crystal material. The sample was cured for approximately 2 hours at an intensity of 1 mW/cm$^2$ at room temperature. Performance parameters of the cured PDLC device are reported in Table 1.

EXAMPLE 24

A PDLC device was prepared according to the procedure of Example 11, except that the monomer/LC blend consisted of 1,3-divinyltetramethyldisiloxane (0.6920 g), trimethylolpropane tris(3-mercaptopropionate) (1.0259 g), BL036 (2.5313 g) and the thermal initiator Vazo 52 (0.0405 g) and the sample was cured thermally by placing it on a hot plate at 90°–95° C. for a few minutes. The thiol/ene stoichiometric ratio was 1.02 and the composition contained 59.0% by weight liquid crystal material. Performance parameters of the cured PDLC device are reported in Table 1.

EXAMPLE 25

A monomer/LC blend of N100, (0.2956 g, an isocyanate obtained from Mobay Corporation, Pittsburgh, Pa.), 1,3-bis(4-hydroxylbutyl)tetramethyldisiloxane (0.4233 g, obtained from Hüls America, Inc.), E7 (0.2910 g), and Fe(cyclopentadienyl)(xylenyl)PF$_6$ (0.0248 g of a 25 wt % solution, internally prepared photocatalyst) was prepared. The isocyanate/alcohol ratio was 1.02 and the composition contained about 36.5% by weight liquid crystal material. Approximately 10 milligrams of this composition was placed in a DSC pan. The DSC sample was irradiated at 75 mW/cm$^2$ and heated at 5° C./minute from 25° to 150° C. in a Seiko Instruments PhotoDSC. The sample cured but remained clear. Additional E7 (0.248 g) was added to bring the composition to about 51.5% by weight liquid crystal material. 18.55 milligrams was placed in a DSC pan and irradiated and heated as above. An exotherm onset of 47.2° C. was detected. The DSC sample cured into a white opaque material.

COMPARATIVE EXAMPLE 1

A PDLC device was prepared according to the procedure of Example 11, except that the monomer/LC blend consisted of triallyl-1,3,5-triazine-2,4,6(1H,3H,5H)-trione (0.2000 g, available from Aldrich), trimethylolpropane tris(3-mercaptopropionate) containing an unrecorded amount of Irgacure 651 (0.3105 g), and BL036 (0.5038 g). The thiol/ene stoichiometric ratio was 0.96 and the composition contained 49.7% by weight liquid crystal material. The sample was cured at an intensity of 1 mW/cm$^2$ at 49° C. (120° F.). Performance parameters of the cured PDLC device are reported in Table 1.

COMPARATIVE EXAMPLE 2

A PDLC device was prepared according to the procedure of Example 11, except that the monomer/LC blend consisted of trimethylolpropane trimethacrylate (0.2319 g, available from Sartomer), trimethylolpropane tris(3-mercaptopropionate) containing an unrecorded amount of Irgacure 651 (0.2775 g), and BL036 (0.5164 g). The thiol/ene stoichiometric ratio was 1.00 and the composition contained 50.3% by weight liquid crystal material. The sample was cured at an intensity of 6 mW/cm$^2$ at 38° C. (100° F.). Performance parameters of the cured PDLC device are reported in Table 1.

COMPARATIVE EXAMPLE 3

A PDLC device was prepared according to the procedure of Example 1, except that the monomer/LC blend consisted of Norland Optical Adhesive 65 (0.4988g, available from Norland Products, Inc., New Brunswick, N.J.) and E7 (0.5051 g). The composition contained 50.3% by weight liquid crystal material. The sample was cured for 2 minutes at an intensity of 2 mW/cm$^2$ at 23° C. (74° F.). Performance parameters of the cured PDLC device are reported in Table 1.

TABLE 1

| | DEVICE PROPERTIES | | | | | | |
|---|---|---|---|---|---|---|---|
| Example Number | 1 | 2 | 3 | 4 | 5 | 6 | 7 |
| Off-state transmission (%) at room temperature | 23.1 | 33.1 | 0.8 | 15.8 | 2.5 | 0.5 | 3.1 |
| On-state transmission (%) at room temperature at the indicated voltage | 30.8 at 100 VAC 60 Hz | 39.3 at 100 VAC 60 Hz | 37.7 at 100 VAC 60 Hz | 35.3 at 130 VAC 60 Hz | 31.5 at 130 VAC 60 Hz | 31.0 at 130 VAC 60 Hz | 13.6 at 100 VAC 60 Hz |
| Haze (%) at the indicated voltage and 60 Hz | 32 at 84 VAC | nd* | 11–12 at 84 VAC | nd | 18 at 130 VAC | nd | 60 at 84 VAC |
| Glass Transition Temperature (°C.) | nd | nd | −45 to −42 | nd | nd | −54 to −48[1] | −23 to −20 |
| Dielectric Constant (PDLC) | 8–9 | 6 | 10 | 7–8 | 9 | 7–8 | 9 |
| On-state transmission (%) at approximately 20° C. | nd | nd | 35.8 | nd | nd | 30.2 | 12.5 |
| On-state transmission at approximately −20° C. (%) | nd | nd | 35.5 | nd | nd | 26.4 | 10.2 |
| V$_{90}$ (VAC) at approximately 20° C. | nd | nd | 50.5 | nd | nd | 86.8 | 33.2 |
| V$_{90}$ (VAC) at approximately −20° C. | nd | nd | 73.1 | nd | nd | 109.0 | 66.4 |
| (V$_{90}$ at −20° C.)/(V$_{90}$ at 20° C.) | nd | nd | 1.4 | nd | nd | 1.3 | 2.0 |
| Uncured monomers are miscible at room temperature? | nd | nd | nd | nd | nd | nd | nd |
| Uncured monomers and liquid crystal are miscible at room temperature? | nd | Yes | nd | nd | nd | No | Yes |
| Example Number | 8 | 9 | 10 | 11 | 12 | 13 | 14 |
| Off-state transmission (%) at room temperature | 1.4 | 1.3 | 1.3 | 8.4 | 0.2 | 0.2 | 0.5 |

TABLE 1-continued

DEVICE PROPERTIES

| | | | | | | | |
|---|---|---|---|---|---|---|---|
| On-state transmission (%) at room temperature at the indicated voltage | 18.4 at 130 VAC 60 Hz | 13.4 at 130 VAC 60 Hz | 27.6 at 100 VAC 60 Hz | 62.0 at 120 VAC 60 Hz | 67.9 at 120 VAC 60 Hz | 36.3 at 120 VAC 60 Hz | 37.8 at 120 VAC 60 Hz |
| Haze (%) at the indicated voltage and 60 Hz | 96 at 84 VAC | 97 at 84 VAC | 19 at 84 VAC | nd | nd | nd | nd |
| Glass Transition Temperature (°C.) | nd | nd | nd | nd | nd | nd | nd |
| Dielectric Constant (PDLC) | 9–10 | 10 | 8 | nd | nd | 9 | nd |
| On-state transmission (%) at approximately 20° C. | nd | nd | nd | nd | nd | 39.1 | nd |
| On-state transmission at approximately −20° C. (%) | nd | nd | nd | nd | nd | 39.5 | nd |
| $V_{90}$ (VAC) at approximately 20° C. | nd | nd | nd | nd | nd | 69.6 | nd |
| $V_{90}$ (VAC) at approximately −20° C. | nd | nd | nd | nd | nd | 74.8 | nd |
| ($V_{90}$ at −20° C.)/($V_{90}$ at 20° C.) | nd | nd | nd | nd | nd | 1.1 | nd |
| 0Uncured monomers are miscible at room temperature? | nd | nd | nd | Yes | nd | nd | nd |
| Uncured monomers and liquid crystal are miscible at room temperature? | Close | No | Yes | Close | nd | nd | nd |

| Example Number | 15 | 16 | 17 | 18 | 19 | 20 | 21 |
|---|---|---|---|---|---|---|---|
| Off-state transmission (%) at room temperature | 0.2 | 1.5 | 0.6 | 0.5 | 0.3 | 3.1 | 30.0 |
| On-state transmission (%) at room temperature at the indicated voltage | 71.2 at 120 VAC 60 Hz | 31.2 at 120 VAC 60 Hz | 32.3 at 120 VAC 60 Hz | 79.7 at 100 VAC 60 Hz | 24.5 at 100 VAC 60 Hz | 67.4 at 100 VAC 60 Hz | 76.5 at 50 VAC 60 Hz |
| Haze (%) at the indicated voltage and 60 Hz | nd | nd | nd | nd | nd | nd | nd |
| Glass Transition Temperature (°C.) | −34 to −22 | nd | nd | nd | nd | nd | nd |
| Dielectric Constant (PDLC) | | 6–9 | 8 | nd | nd | nd | nd |
| On-state transmission (%) at approximately 20° C. | 71.2 | 30.1 | 32.4 | 79.2 | 47.6 | 77.8 | nd |
| On-state transmission at approximately −20° C. (%) | 66.8 | 29.2 | 31.8 | 80.6 | 36.4 | 71 | nd |
| $V_{90}$ (VAC) at approximately 20° C. | 61.9 | 60.0 | 58.5 | 26.7 | 235.0 | 74.3 | nd |
| $V_{90}$ (VAC) at approximately −20° C. | 96.1 | 71.8 | 68.3 | 49.8 | 307.6 | 186 | nd |
| ($V_{90}$ at −20° C.)/($V_{90}$ at 20° C.) | 1.6 | 1.2 | 1.2 | 1.9 | 1.3 | 2.5 | nd |
| Uncured monomers are miscible at room temperature? | nd | No | nd | nd | nd | nd | nd |
| Uncured monomers and liquid crystal are miscible at room temperature? | nd | Yes | nd | No | nd | nd | Yes |

| Example Number | 22 | 23 | 24 | CE-1 | CE-2 | CE-3 |
|---|---|---|---|---|---|---|
| Off-state transmission (%) at room temperature | 36.5 | 30.1 | 2.5 | 13.4 | 0.3 | 0.8 |
| On-state transmission (%) at room temperature at the indicated voltage | 67.1 at 100 VAC 60 Hz | 61.8 at 50 VAC 60 Hz | 37.5 at 120 VAC 60 Hz | 72.7 at 100 VAC 60 Hz | 48.2 at 100 VAC 60 Hz | 30.5 at 100 VAC 60 hz |
| Haze (%) at the indicated voltage and 60 Hz | nd | nd | nd | nd | nd | nd |
| Glass Transition Temperature (°C.) | nd | nd | nd | nd | nd | −5 to −1 |
| Dielectric Constant (PDLC) | nd | nd | nd | nd | nd | 12–13 |
| On-state transmission (%) at approximately 20° C. | 80.8 | 67.3 | nd | 53.1 | 65.7 | 32.3 |
| On-state transmission at approximately −20° C. (%) | 74.6 | 59.1 | nd | 41.9 | 49.6 | 13.4 |
| $V_{90}$ (VAC) at approximately 20° C. | 28.2 | 73.7 | nd | 120.3 | 136.5 | 51.4 |
| $V_{90}$ (VAC) at approximately −20° C. | 83.7 | 76.7 | nd | 228.2 | 195.2 | 95.8 |
| ($V_{90}$ at −20° C.)/($V_{90}$ at 20° C.) | 3.0 | 1.0 | nd | 1.9 | 1.4 | 1.9 |
| Uncured monomers are miscible at room temperature? | nd | nd | nd | nd | nd | nd |
| Uncured monomers and liquid crystal are miscible at room temperature? | Yes | Close | nd | nd | nd | Yes |

[1] Matrix only; no liquid crystal.
*nd denotes not determined

MISCIBILITY EXAMPLE 1

Several vinyl silanes (available from Hüls America) were combined with pentaerythritol tetrakis(3-mercaptopropionate) (PETMP) containing 1.95 wt % Irgacure 651 and their miscibility at room temperature was noted. The results are reported in Table 2.

Liquid crystal, vinyl silanes and pentaerythritol tetrakis(3-mercaptopropionate) (PETMP) containing 1.95 wt % Irgacure 651 were combined and their miscibility at room temperature was noted. The results are reported in Table 3.

TABLE 2

Vinyl Silane/Thiol Miscibility

| Vinyl Silane | Vinyl Silane (g) | PETMP (g) | Room Temperature Miscible? |
|---|---|---|---|
| 1,4-divinyl-1,1,4,4-tetramethyl-disilylethylene (D6212) | 1.00 | 1.29 | No |
| trivinylmethylsilane (T4260) | 0.40 | 1.27 | No |
| tris(vinyldimethylsiloxy)-methylsilane (T4250) | 1.17 | 1.28 | No |
| 1,3,5-trivinyl-1,1,3,5,5-penta-methyltrisiloxane (T4290) | 0.91 | 1.28 | No |
| tetravinylsilane (T2150) | 0.33 | 1.30 | No |
| 1,1,3,3-tetravinyldimethyl-disiloxane (T2145) | 0.53 | 1.28 | No |
| 1,3,5,7-tetravinyltetramethyl-cyclotetrasiloxane (T2160) | 0.87 | 1.28 | No |
| 1,3-divinyl-1,3-diphenyl-1,3-dimethyldisiloxane ([D6206.9) | 1.5561 | 1.2793 | No |

TABLE 3

Vinyl Silane/Thiol/Liquid Crystal Miscibility

| Liquid Crystal | Liquid Crystal (g) | Vinyl Silane | Vinyl Silane (g) | PETMP (g) | Room Temperature Miscible? |
|---|---|---|---|---|---|
| BL009 | 0.55 | T2150 | 0.09 | 0.38 | No |
| BL009 | 0.20 | T2150 | 0.09 | 0.38 | Close |
| BL009 | 0.11 | T2150 | 0.09 | 0.40 | Yes |
| E7 | 0.34 | T2150 | 0.05 | 0.19 | No |
| E7 | 0.22 | T2150 | 0.09 | 0.40 | Yes |
| BL009 | 0.22 | T4260 | 0.11 | 0.34 | Yes |
| BL009 | 0.295 | D6212 | 0.247 | 0.316 | No |
| BL009 | 0.310 | T4258 | 0.290 | 0.310 | No |
| BL009 | 0.298 | T4290 | 0.242 | 0.298 | No |
| BL009 | 0.266 | T2145 | 0.129 | 0.266 | No |
| BL009 | 0.270 | T2160 | 0.219 | 0.270 | No |
| BL009 | 0.205 | T4260 | 0.101 | 0.205 | No |
| BL009 | 0.212 | T4260 | 0.103 | 0.212 | Close |
| BL009 | 0.197 | T4260 | 0.100 | 0.197 | Close |
| E7 | 2.8493 | D6206.9 | 1.5561 | 1.2793 | Yes |

Other embodiments are within the following claims.

For example, the matrix may be thermally cured.

What is claimed is:

1. An optically responsive film comprising liquid crystal dispersed in a polymer matrix comprising siloxane linkages, said film comprising the reaction product of at least one multi-functional siloxane-containing reactant in which the functional groups of said reactant are at least three carbon atoms away from the silicon atom, said film having a transmissivity at −20° C. that is substantially the same as the transmissivity of said film at 20° C. and a $V_{90}$ at −20° C. that is less than twice the value at 20° C.

2. An optically responsive film comprising liquid crystal dispersed in a polymer matrix comprising siloxane linkages, said film comprising the reaction product of at least one vinyl-functional siloxane having the general formula $[CH_2{=}CH]_xR_{3-x}SiOSiR_{3-y}[CH{=}CH_2]_y$ where the sum x and y is between 2 and 6, inclusive, and R is phenyl or a lower alkyl group, said film having a transmissivity at −20° C. that is substantially the same as the transmissivity of said film at 20° C. and a $V_{90}$ at −20° C. that is less than twice the value at 20° C.

3. The optically responsive film of claim 2 wherein at least one of said vinyl-functional siloxanes comprises 1,3-divinyltetramethyldisiloxane; 1,3-divinyl-1,3-diphenyldimethyldisiloxane; 1,1,3,3-tetravinyldimethyldisiloxane; or 1,3,5,7-tetravinyltetramethylcyclotetrasiloxane.

4. An optically responsive film comprising liquid crystal dispersed in a polymer matrix that comprises the polymerization product of at least one multi-functional vinyl silane and at least one multi-functional thiol.

5. The optically responsive film of claim 4 wherein the stoichiometric ratio of thiol to vinyl silane ranges from about 0.5 to 3.0.

6. The optically responsive film of claim 4 wherein the stoichiometric ratio of thiol to vinyl silane is about 1.0.

7. The optically responsive film of claim 4 wherein at least one of said vinyl silanes has the general formula $[CH_2{=}CH]_nSiR_{4-n}$ where n is an integer between 2 and 4, inclusive, and R is phenyl or a lower alkyl group.

8. The optically responsive film of claim 7 wherein said vinyl silane comprises trivinylmethylsilane, divinyldimethylsilane, divinyldiphenylsilane, or tetravinylsilane.

9. The optically responsive film of claim 4 wherein at least one of said vinyl silanes is a vinyl siloxane having the general formula $[CH_2{=}CH]_xR_{3-x}SiOSiR_{3-y}[CH{-}CH_2]_y$ where the sum of x and y is between 2 and 6, inclusive, and R is phenyl or a lower alkyl group.

10. The optically responsive film of claim 9 wherein said vinyl silane comprises 1,3-divinyltetramethyldisiloxane; 1,3-divinyl-1,3-diphenyldimethyldisiloxane; or 1,1,3,3-tetravinyldimethyldisiloxane.

11. The optically responsive film of claim 4 wherein at least one of said vinyl silanes is a cyclic vinyl siloxane having the general formula $[[CH_2{=}CH]_xR_{2-x}{-}SiO]_y$ where x is greater than zero but less than or equal to 2, y is between 3 and 6, inclusive, and R is phenyl or a lower alkyl group.

12. The optically responsive film of claim 11 wherein at least one of said vinyl silanes comprises 1,3,5,7-tetravinyltetramethylcyclotetrasiloxane.

13. The optically responsive film of claim 4 wherein at least one of said multi-functional thiols has the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive.

14. The optically responsive film of claim 4 wherein at least one of said thiols comprises trimethylolpropane tris(3-mercaptopropionate) or pentaerythritol tetrakis(3-mercaptopropionate).

15. The optically responsive film of claim 4 wherein at least one of said thiols comprises a mercapto-functional siloxane.

16. The optically responsive film of claim 15 wherein said thiol comprises (a) poly(3-mercaptopropylmethylsiloxane), or oligomers or copolymers thereof, or (b) 1,1,3,3-tetramethyl-1,3-bis(3-mercaptopropyl)disiloxane.

17. The optically responsive film of claim 4 wherein said matrix comprises the polymerization product of at least one multi-functional vinyl silane, at least one multi-functional thiol, and at least one mono-functional reactant.

18. The optically responsive film of claim 17 wherein said mono-functional reactant comprises a mono-functional allyl, acrylate, methacrylate, acrylamide, methacrylamide, thiol, vinyl silane, silicon hydride, or combination thereof.

19. The optically responsive film of claim 4 wherein said matrix comprises the reaction product of at least one multi-functional vinyl silane, at least one multi-functional thiol, and at least one multi-functional reactant different from said vinyl silane and said thiol.

20. The optically responsive film of claim 19 wherein said multi-functional reactant comprises a multi-functional allyl, acrylate, methacrylate, acrylamide, methacrylamide, silicon hydride, or combination thereof.

21. The optically responsive film of claim 4 wherein said liquid crystal is in the form of discrete droplets dispersed throughout the matrix.

22. The optically responsive film of claim 4 wherein the size of said liquid crystal droplets ranges from about 0.1 to 10 times the wavelength of light to be scattered.

23. The optically responsive film of claim 4 wherein said film comprises the ultraviolet-radiation cured polymerization product of said vinyl silane and said thiol.

24. The optically responsive film of claim 4 wherein said film comprises the thermally cured polymerization product of said vinyl silane and said thiol.

25. The optically responsive film of claim 4 wherein said film has a transmissivity at −20° C. that is substantially the same as the transmissivity of said film at 20° C. and a $V_{90}$ at −20° C. that is less than twice the value at 20° C.

26. A light modulating device comprising an optically responsive film to which an electric field is applied through a pair of electrodes, said optically responsive film comprising liquid crystal dispersed in a matrix that comprises the polymerization product of at least one multi-functional vinyl silane and at least one multi-functional thiol.

* * * * *